United States Patent [19]
Jeddeloh

[11] Patent Number: 6,076,182
[45] Date of Patent: Jun. 13, 2000

[54] MEMORY FAULT CORRECTION SYSTEM AND METHOD

[75] Inventor: Joseph Jeddeloh, Minneapolis, Minn.

[73] Assignee: Micron Electronics, Inc., Nampa, Id.

[21] Appl. No.: 08/767,180

[22] Filed: Dec. 16, 1996

[51] Int. Cl.[7] .................................................. G11C 29/00
[52] U.S. Cl. .......................... 714/763; 714/768; 714/764
[58] Field of Search ................................ 371/40.11, 37.2;
714/763, 758, 764, 768

[56] References Cited

U.S. PATENT DOCUMENTS

| | | | |
|---|---|---|---|
| 5,164,944 | 11/1992 | Benton et al. | 371/40.3 |
| 5,206,865 | 4/1993 | Gruender, Jr. et al. | 371/40.12 |
| 5,490,155 | 2/1996 | Abdoo et al. | 714/763 |
| 5,511,078 | 4/1996 | Barucchi et al. | 371/40.11 |
| 5,555,250 | 9/1996 | Walker et al. | 371/40.11 |
| 5,751,740 | 5/1998 | Helbig, Sr. | 711/203 |
| 5,754,753 | 5/1998 | Smelser | 714/763 |

OTHER PUBLICATIONS

Shanley, Tom and Don Anderson, *ISA System Architecture*, 3rd ed., Addison–Wesley, Reading, Mass., 1995, "Ch. 13: RAM Memory: Theory of Operation," pp. 235–272.

*Primary Examiner*—Albert De Cady
*Assistant Examiner*—Shelly A Chase
*Attorney, Agent, or Firm*—Dorsey & Whitney LLP

[57] ABSTRACT

A memory fault correction system enables plural data bit errors in a single data word to be corrected in an efficient manner. The system divides each data word into a plurality of sub-words and creates a separate error correction code for each of the sub-words. Each of the error correction codes includes a plurality of check bits with check bit values based on the data bit values of the corresponding sub-word of the data word. The computer system includes a plurality of error correction modules each performing error correction on a separate sub-word of the data word. A memory controller rearranges the data bits of the data word when forming the sub-words such that consecutive data bits are arranged in separate sub-words.

26 Claims, 2 Drawing Sheets

MEMORY FAULT CORRECTION SYSTEM AND METHOD

TECHNICAL FIELD

The present invention relates to computer memory, and more particularly, to a system and method for allowing memory devices having defective memory locations to be used in high accuracy applications.

BACKGROUND OF THE INVENTION

Substantially all modern electronic computers rely on semiconductor memory to store data for processing by a central processing unit (CPU). Such computers employing semiconductor memory vary from simple computers, such as those contained in telephone answering machines, to highly complex supercomputers employed for complicated scientific projects. In simple computers like those used for telephone answering machines, errors in one or more of the memory locations of the memory may not be fatal. For example, a mistake in the memory of the telephone answering machine likely would only cause the synthesized voice stored on the memory to be imperceptibly altered. However, one or more defective memory locations in a memory of a computer used to perform scientific calculations may cause substantial problems.

Although current manufacturing techniques have substantially reduced the number of defective memory locations, excessive numbers of defective memory locations are still sometimes produced during fabrication of computer memory. Those defective memory locations can be caused by any of numerous steps taken during manufacture of the memory chips, semiconductor crystallinity defects, electrical connector discontinuities, etc. Although memory chips with such defective memory locations typically represent a small portion (less than 1%) of the total number of memory chips produced, the actual number of such defective memory chips is substantial. In some cases, such defective memory chips could be sold at a greatly reduced price for applications that do not require perfect memory, such as for telephone answering machines. However, it would be beneficial if some of those memory chips could be employed in more critical applications, such as in personal computers.

Several prior art error handling schemes have been employed to compensate for defective memory locations. For example, one error handling scheme employs extra rows of memory cells, known as "redundant rows," that can be used to replace rows having defective memory cells. While the use of redundant rows is often successful in salvaging otherwise defective memory chips, the number of defective rows that can be replaced is limited to the number of redundant rows that are provided on the memory chip. The number of defective rows sometimes exceeds the number of redundant rows, thus preventing repair of some defective rows.

Another prior art error handling scheme, known as error detection, detects when a single bit of a data word is in error. Error detection typically adds a single parity bit to each data word written to memory in order to make the sum of the data word and the parity be an even number. If the sum of the data word and the parity bit is an odd number when the data word is read, then the error detection scheme determines that one of the bits of the data word is in error. Such parity-based error detection often is inadequate because only single bit errors are detected, the particular bit in error is not identified, and the particular bit in error is not corrected.

Yet another error handling scheme, known as error correction, overcomes some of the deficiencies in prior art error detection schemes. Prior art correction schemes add to each data word an error correction code having plural error correction bits that enable the data word to be reconstituted in the event of an erroneous data bit within the data word. However, such prior art error correction schemes typically only reconstitute a data word if only a single bit of the data word is erroneous. Such single bit correction may be adequate when each data word includes only eight or sixteen data bits, but may be inadequate in more advanced computer systems, such as computer systems based on Intel's Pentium Pro™ processor, which employ 64 bit data words. Such long data words have a much higher chance of having multiple data bits altered in error than eight or sixteen bit data words, and thus, single bit error detection may not provide the level of data protection desired by users of such advanced computer systems.

SUMMARY OF THE INVENTION

A preferred embodiment of the present invention is directed to computer system and method for storing data subject to memory errors. The preferred embodiment enables plural data bit errors in a single data word to be corrected in an efficient manner. The preferred embodiment divides each data word into a plurality of sub-words and creates a separate error correction code for each of the sub-words. Each of the error correction codes includes a plurality of check bits with check bit values based on the data bit values of the corresponding sub-word of the data word. Preferably, the computer system includes a plurality of error correction modules, each performing error correction on a separate sub-word of the data word. In the preferred embodiment, each data word includes 64 data bits and the data word is divided into four quarter words and a separate error correction code is created for each of the four quarter words.

The preferred embodiment determines a first error correction code for a first sub-word of a data word received for storage and determines a second error correction code for a second sub-word of a data word. The first error correction code includes a plurality of check bits and is determined based on all of the data bits of the first sub-word. Similarly, the second error correction code includes a plurality of check bits and is determined based on all of the data bits of the second sub-word. The data word and the first and second correction codes are entered into a computer memory for storage.

In the preferred embodiment, a memory controller receives the data word, internally rearranges the data bits of the data word to form the sub-words, and creates a separate error correction code for each rearranged sub-word. In particular, the memory controller creates a first sub-word for rearranged sub-words with each sub-word including one data bit from each group of four consecutive data bits of the data word. That is, the first sub-word includes every fourth data bit of the data word beginning with data bit 0 (0, 4, 8, . . . , 60), the second sub-word includes every fourth data bit beginning with data bit 1 (1, 5, 9, . . . , 61), the third sub-word includes every fourth data bit beginning with data bit 2 (2, 6, 10, . . . , 62), and the fourth sub-word includes every fourth data bit beginning with data bit 3 (3, 7, 11, . . . , 63). Each rearranged sub-word is sent to a separate error correction module for creation of the error correction code for the sub-word.

In response to a request for the stored data word, the data word and the first and second error correction codes are retrieved from the memory. The preferred embodiment determines from the first error correction code which of the data bits of the first sub-word was altered in error, if any, while entering or storing the data word in the memory or retrieving the data word from the memory. Similarly, the preferred embodiment determines from the second error correction code which of the data bits of the second sub-word was altered in error while entering or storing the data word in the memory or retrieving the data word from the memory. If a data bit of the first sub-word and/or a data bit of the second sub-word are/is determined to have been altered in error, then the data bit or bits are corrected.

DETAILED DESCRIPTION OF THE INVENTION

Figure 1:
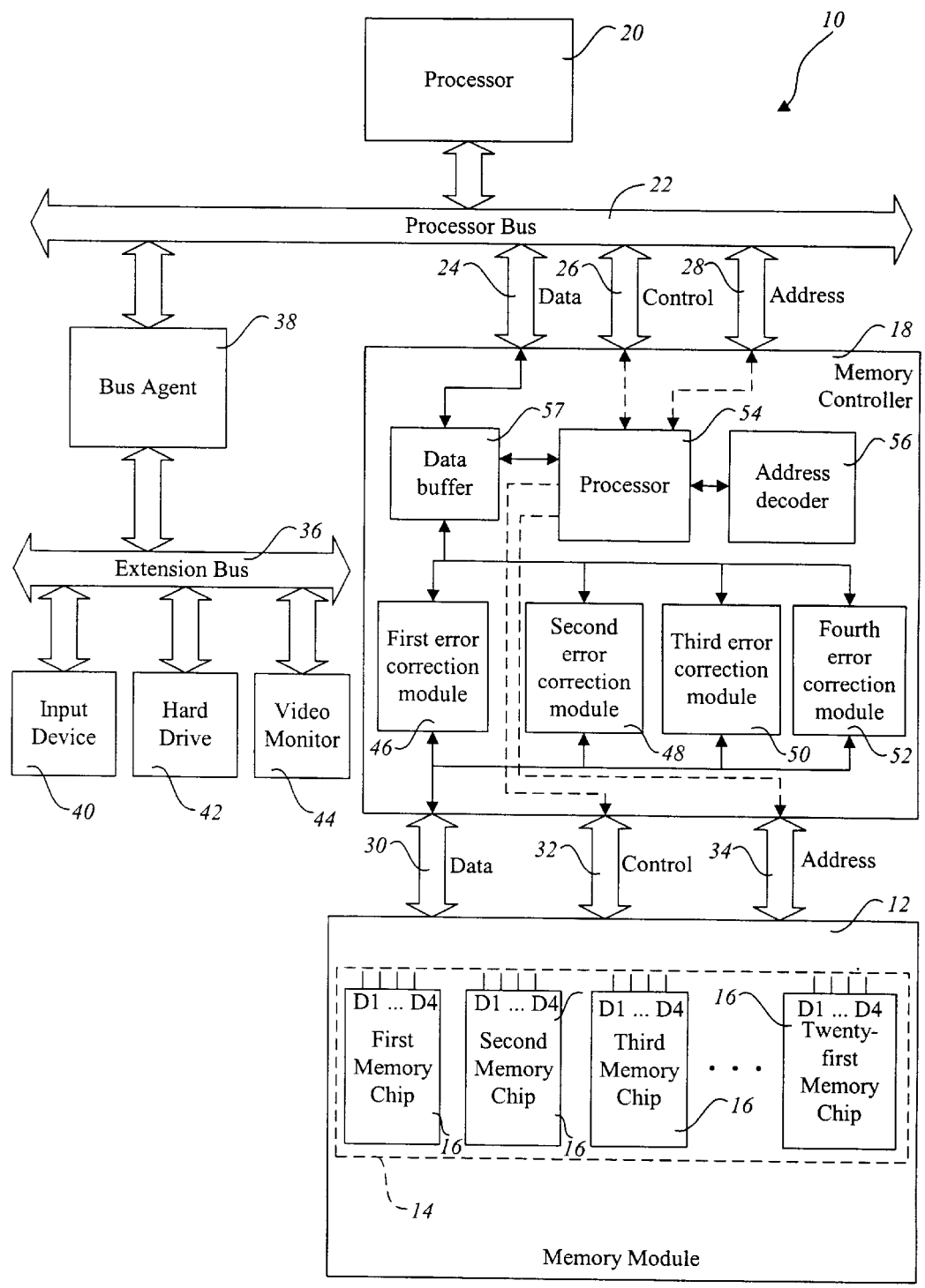
FIG. 1 is a block diagram of a computer system for multi-bit error correction according to a preferred embodiment of the present invention.

A computer system 10 for storing data in a memory module 12 according to a multi-bit error correction scheme is shown in FIG. 1. The memory module 12 can be any of numerous types of memory modules, such as a double in-line memory module (DIMM). The memory module 12 includes a memory bank 14 of 21 memory chips 16. It will be appreciated that the memory module 12 can include additional memory banks and each memory bank, including the memory bank 14, could include greater or less than 21 memory chips without departing from the invention.

The computer system 10 includes a memory controller 18 that controls the manner in which data is written to and read from the memory bank 14 of the memory module 12. The memory controller 18 interfaces the memory module 12 with a computer processor 20 via a processor bus 22. The processor bus 22 includes data, control, and address buses 24, 26, 28, that provide communication between the memory controller 18 and the processor 20 in a well-known manner. Similarly, the memory controller 18 interfaces with the memory module 12 via data, control, and address buses 30, 32, 34 as will be discussed in more detail below. As is typical, the computer system 10 also includes an extension bus 36 that is coupled to the processor bus 22 by a bus agent 38. Coupled to the extension bus 36 are an input device 40, such as a keyboard, mouse, or electronic pen/tablet, a hard drive 42, and a video monitor 44.

In contrast to prior art memory controllers, the memory controller 18 provides multi-bit error correction of data words stored in the memory bank 14 of the memory module 12. According to the preferred embodiment shown in FIG. 1, the memory controller 18 provides such multi-bit error correction using first, second, third, and fourth error correction modules 46, 48, 50, 52. Each of the first through fourth error correction modules 46–52 performs error correction on a separate sub-word of each data word stored in the memory module. In the preferred embodiment, each data word includes 64 data bits and each of the correction modules 46–52 performs error correction on a separate 16 bit sub-word of each data word. In addition, each sub-word preferably is formed by rearranging the data bits of the data word such that each sub-word includes one data bit from each group of four consecutive data bits of the data word.

The memory controller 18 also includes a processor 54, an address decoder 56, and a data buffer 57 that enable the controller 18 to respond to requests or access to the memory module 12 from the processor 20 or bus agent 38 via the processor bus 22. The memory controller processor 54 preferably is a general purpose microprocessor programmed with software to perform memory control functions, but could also be of a hard-wired circuit design. The address decoder 56 stores a table that includes an indication of which memory addresses are associated with a memory bank 14. That is, the address decoder 56 stores a definition of the address boundaries for the memory bank 14 and any other memory banks of the memory module 12. The data buffer 57 temporarily stores each data word requested to be written to memory module 12 and each data word read from the memory module 12.

In the preferred embodiment, the memory bank 14 is known as a "×4 (pronounced 'by-4') device" because each of the memory chips 16 includes 4 data ports D1–D4 that allow four data bits to be written to or read from the memory chip simultaneously. The four data ports D1–D4 of each of the memory chips 16 are coupled to the data bus 30 to receive data into the memory chips 16 from the memory controller 18. Each memory chip 16 also includes control ports (not shown) that are coupled to the control bus 32 to receive control signals, such as read, write, row select (RAS#), and column select (CAS#), from the memory controller 18. Each memory chip 16 also includes several address ports (not shown) coupled to the address bus 34 to receive the address of each memory location in the memory chips 16 desired to be accessed. The memory chips 16 are connected in parallel to the control bus 32 and address bus 34 so that the same control signals and address are provided to each of the memory chips 16. Each address received from the address bus 34 indexes four consecutive data bit cells in each of the memory chips 16 such that four data bits can be written to or read from each of the memory chips 16 via the data ports D1–D4 in parallel. The 64 bits of data on the data bus 30 thus require 16 of the memory chips 16. The remaining 5 memory chips 16 are used to store error correcting codes, as explained below.

The computer system 10 performs typical computer functions using information, including software instructions and data, stored in the memory module 12. For example, the processor 20 typically retrieves software instructions from the hard drive 42 and sends the software instructions to the memory module 12 for temporary storage therein. The software instructions subsequently are read from the memory module 12 to enable the processor 20 to perform the functions mandated by the software instructions.

The processor 20 sends information, such as software instructions and data, to the memory module 12 by transmitting to the memory controller 18 a transaction request that requests access to the memory module 12. The transaction request includes a data word transmitted across the data bus 24, a write signal transmitted across the control bus 26, and a memory address transmitted across the address bus 28. The data word transmitted on the data bus 24 can include any number of data bits depending on the type of memory module being accessed, but in the preferred embodiment each data word includes 64 data bits. As used herein, each data word can include data or one or more software instructions.

Upon receiving the transaction request from the processor 20 via the processor bus 22, the memory controller processor 54 uses the address decoder 56 to determine whether the address received from the address lines 28 of the processor bus 22 is a memory address assigned to the memory bank 14. If the address of the transaction request has been assigned to the memory bank 14, then the processor 54 transmits to each of the error correction modules 46–52 a write signal which alerts the error correction modules that a data word received from the data bus 24 is desired to be written to the memory module 12. Each of the error correction modules 46–52 receives a different sub-word of the data word from the data buffer 57. Each of the error correction modules 46–52 performs error correction on its respective sub-word to create an error correction code for the sub-word. The error correction modules 46–52 then transmit the respective sub-words and error correction codes to the memory module 12 via the data bus 30.

Figure 2:
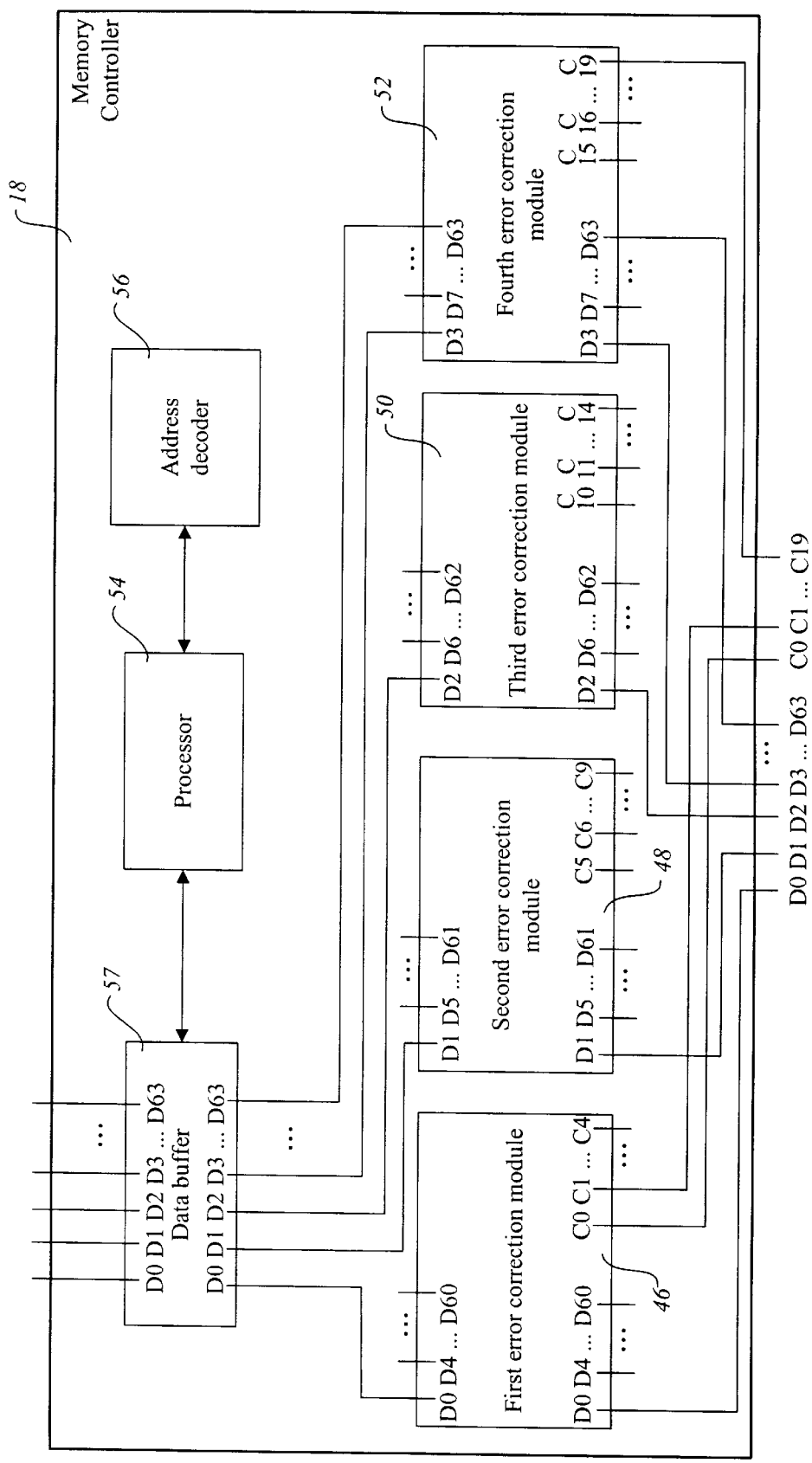
FIG. 2 is a block diagram of a memory controller employed in the preferred embodiment shown in FIG. 1.

An enlarged block diagram of the memory controller 18 is shown in FIG. 2. In the preferred embodiment, the sub-words directed to the error correction modules 46–52 comprise alternating data bits of the data word stored in the data buffer 57. In particular, the first error correction module 46 receives a sub-word that includes every fourth data bit of the data word beginning with data bit D0 and ending with data bit D60. Similarly, the second error correction module 48 receives a second sub-word that includes D1, D5, . . . , D61, the third correction module 50 receives a third sub-word that includes data bits D2, D6, . . . , D62, and the fourth error correction module 52 receives a fourth sub-word that includes data bits D3, D7, . . . , D63. As a result, each of the error correction modules 46–52 receives a respective 16-bit sub-word of the data word from the data buffer 57.

Each of the error correction modules 46–52 creates a separate error correction code based on the bit values of the sub-word received by the error correction module. It can be shown mathematically that for a sub-word that includes 16 data bits, the error correction code must include at least five check bits in order to be able to correct any one of the 16 data bits. Numerous known error correction schemes can be employed, but in the preferred embodiment the five check bits of each error correction code are calculated according to the following parity equations, wherein the bar over the $C_0$, $C_2$, and $C_4$ represents the complement operation and the $\oplus$ symbol indicates an exclusive OR operation.

$$\begin{aligned}
\overline{C_0} &= \phantom{X_0 \oplus {}} \phantom{X_1 \oplus {}} X_2 \phantom{{}\oplus X_3} \phantom{{}\oplus X_4} \oplus X_5 \phantom{{}\oplus X_6} \phantom{{}\oplus X_7} \phantom{{}\oplus X_8} \phantom{{}\oplus X_9} \oplus X_{10} \oplus X_{11} \oplus X_{12} \oplus X_{13} \oplus X_{14} \oplus X_{15} \\
C_1 &= \phantom{X_0 \oplus X_1 \oplus X_2 \oplus X_3 \oplus {}} X_4 \oplus X_5 \oplus X_6 \oplus X_7 \oplus X_8 \oplus X_9 \oplus X_{10} \phantom{{}\oplus X_{11} \oplus X_{12} \oplus X_{13} \oplus X_{14}} \oplus X_{15} \\
\overline{C_2} &= \phantom{X_0 \oplus {}} X_1 \oplus X_2 \oplus X_3 \phantom{{}\oplus X_4 \oplus X_5 \oplus X_6 \oplus {}} X_7 \oplus X_8 \oplus X_9 \phantom{{}\oplus X_{10} \oplus X_{11} \oplus X_{12} \oplus X_{13}} \oplus X_{14} \oplus X_{15} \\
C_3 &= X_0 \phantom{{}\oplus X_1} \oplus X_2 \oplus X_3 \oplus \phantom{{}\oplus X_4 \oplus {}} X_5 \oplus X_6 \phantom{{}\oplus X_7 \oplus X_8} \oplus X_9 \phantom{{}\oplus X_{10} \oplus X_{11}} \oplus X_{12} \oplus X_{13} \\
\overline{C_4} &= X_0 \oplus X_1 \phantom{{}\oplus X_2} \oplus X_3 \oplus X_4 \phantom{{}\oplus X_5} \oplus X_6 \phantom{{}\oplus X_7} \oplus X_8 \phantom{{}\oplus X_9 \oplus X_{10}} \oplus X_{11} \phantom{{}\oplus X_{12}} \oplus X_{13}
\end{aligned}$$

With respect to the first error correction module 46, the values $X_0, X_1, \ldots, X_{15}$ represent data bits D0, D4, . . . , D60, respectively. Similarly, with respect to the second through fourth error correction modules 48, the $X_0, X_1, \ldots, X_{15}$ in the five parity equations represent the sixteen data bits of the sub-word received by each of the second through fourth error correction modules. In addition, check bits $C_0$–$C_4$ in the five parity equations represent check bits when used with the first through fourth error correction modules 46–52, respectively.

The data word (64 bits) and the four error correction codes (20 bits) are received by the memory module 12 via the data bus 30. Preferably, the data word and error correction codes are entered into the memory bank 14 in sequential order such that data bits D0–D3 are stored in the first memory chip 16, data bits D4–D7 are entered into the second memory chip, etc. As such, the data bits of the data word are stored in the first through the sixteenth memory chips 16 and the 20 check bits of the four error correction codes are stored in the seventeenth through twenty-first memory chips 16.

It should be appreciated that each of the first through sixteenth memory chips 16 stores a single data bit from each of the four sub-words of the data word written to the memory bank 14. For example, the first memory chip 16 stores data bits D0, which is from the first sub-word; D1, which is from the second sub-word; D3, which is from the third sub-word; and D4, which is from the fourth sub-word. As a result, even if all four data bits of the data word that are stored in any one of the first through sixteenth memory chips 16 are mistakenly altered during storage, the first through fourth error correction modules 46–52 will be able to correct all four of the mistakenly altered data bits. Such correction is very desirable because it has been found that data bit errors often occur in groups of four from individual memory chips.

At some point, the processor 20 will request the data word to be read from the memory chips 16 of the memory module 12. However, while writing the data word to, storing the data word in, or reading the data word from the memory module 12, any of the 64 data bits of the data word may have been altered in error. The first through fourth error correction modules 46–52 are employed by the memory controller 18 to correct any erroneous data bit in any of the four sub-words of the data word that is read from the memory module.

The processor 20 requests the data word to be read from the memory module 12 by issuing a read signal on the control lines 26 of the processor bus 22 and placing the memory address at which the data word is stored on the address lines 28 of the data bus. The memory controller processor 54 forwards the read signal and the memory address to the memory module 12 via the control 32 and address 34 buses, respectively. The read signal causes reading devices (not shown) within the memory module 12 to read the requested 64 bit data word and 20 check bits of the corresponding four error correction codes from the memory bank 14.

The first through fourth error correction modules 46–52 receive their respective sub-words of the data word and their respective error correction codes from the memory module 12 via the data bus 30. Each error correction module uses its error correction code to determine whether there are any erroneous data bits in its 16-bit sub-word. Each error correction module 46–52 uses the five parity equations shown above to calculate a separate new error correction code based on the sub-word received by the error correction module from the memory module 12. Each error correction module 46–52 creates an error vector by comparing each of the check bits of the error correction code read from the memory module 12 with the new check bits of the new error correction code calculated based on the data bits of the sub-word read from the memory module 12. In other words, the error vector E can be calculated according to the following equation wherein $C_0$–$C_4$ represents the check bits read from the memory module 12 and $C_0^*$–$C_4^*$ represent the check bits computed based on the data bits of the sub-word read from the memory module 12.

$$E = (C_0 \oplus C_0^*, C_1 \oplus C_1^*, C_2 \oplus C_2^*, C_3 \oplus C_3^*, C_4 \oplus C_4^*)$$

The value of the error vector E calculated by each error correction module 46–52 will indicate which data bit of the sub-word received by the error correction module, if any, is erroneous. If the error vector E equals "00000," then no detectable error has occurred. That is because an error vector of "00000" means that the five check bits of the error correction code read from the memory module 12 equal the five check bits of the new error correction code calculated based on the data bits of the sub-word read from the memory module 12.

If the error vector E includes any "1" bits, then an error has occurred. The positions of the 1's in the error vector E enable the error correction module to determine which of the 16 data bits of the sub-word received by the error correction module is erroneous. For example, if the error vector E equals "00101," then the error correction module knows that data bit $X_1$ is erroneous. That such a conclusion is correct can be appreciated based on the five parity equations shown above in which data bit $X_1$ is the only data bit that is included in only the parity equations for check bits $C_2$ and $C_4$, which corresponds to the error vector E of "00101".

Table 1 below shows which of the 16 data bits of the sub-word is erroneous based on 16 different error vectors. If the error vector is not all zero's (indicating no error) or one of the error vectors shown in Table 1, then one of the check bits of the error correction code read from the memory module 12 with the sub-word is erroneous. In such an event, the error correction module 46–52 should include some check bit error processing logic as is well known in the art. Each of the error correction modules 46–52 will store a table identical to Table 1 in order to determine which data bit, if any, of each 16 bit sub-word is erroneous.

TABLE 1

| Error Vector | Erroneous Bit | Error Vector | Erroneous Bit | Error Vector | Erroneous Bit |
|---|---|---|---|---|---|
| 00011 | $x_0$ | 01011 | $x_6$ | 10010 | $x_{12}$ |
| 00101 | $x_1$ | 01100 | $x_7$ | 10011 | $x_{13}$ |
| 10110 | $x_2$ | 01101 | $x_8$ | 10100 | $x_{14}$ |
| 00111 | $x_3$ | 01110 | $x_9$ | 11100 | $x_{15}$ |
| 01001 | $x_4$ | 11000 | $x_{10}$ | | |
| 11010 | $x_5$ | 10001 | $x_{11}$ | | |

After determining which data bit, if any, of the sub-word is erroneous, the error correction module 46–52 corrects the erroneous data bit by complementing the erroneous data bit (changing a 0 to 1 or a 1 to a 0). Each error correction module 46–52 sends its sub-word (corrected as necessary) to the data buffer 57 and informs the memory controller processor 54 that its sub-word is ready for transmission to the processor 20. When all of the sub-words of the data word are in the data buffer 57, then the memory controller processor 54 signals the data buffer 57 to transfer the entire data word to the processor 20 via the data lines 24 of the processor bus 22. The processor 54 also sends a signal to the processor 20 via the control lines 26 indicating that the read request has been satisfied.

Based on the foregoing discussion, it will be appreciated that the preferred embodiment of the invention provides multi-bit error correction in an efficient manner. As a result, the preferred embodiment corrects plural data bit errors in a data word which would go uncorrected using prior art error correction schemes. Accordingly, the preferred embodiment provides users of advanced, high bandwidth computer systems with greatly increased protection against data bit errors.

It should be understood that even though numerous advantages of the present invention have been set forth in the foregoing description of a preferred embodiment, the above disclosure is illustrative only. Changes may be made in detail and yet remain within the broad principles of the present invention. As such, the method and apparatus of the present invention are defined by the claims which follow and are not limited to the preferred embodiment described herein.

I claim:

1. A method of storing data in a computer system memory, comprising:

receiving a data word having a plurality of consecutive data bits;

determining a first error correction code for a first sub-word of the data word, the first sub-word including a first subset of the data bits of the data word, the first subset comprising alternate data bits of the data word, the first error correction code including a plurality of check bits and being determined based on all of the data bits of the first sub-word;

determining a second error correction code for a second sub-word of the data word, the second sub-word including a second subset of the data bits of the data word, the second subset comprising alternate data bits of the data word that are interleaved with the data bits included in the first subset, the second error correction code including a plurality of check bits and being determined based on all of the data bits of the second sub-word;

entering and storing the data word and the first and second error correction codes in the memory;

retrieving the data word and the first and second error correction codes from the memory;

determining from the first error correction code which of the data bits of the first sub-word was altered in error, if any, between entering the data word in the memory and retrieving the data word from the memory;

if a data bit of the first sub-word is determined to have been altered in error, then correcting the data bit;

determining from the second error correction code which of the data bits of the second sub-word was altered in error between entering the data word in the memory and retrieving the data word from the memory; and if a data bit of the second sub-word is determined to have been altered in error, then correcting the data bit.

2. The method of claim 1 wherein the storing step includes storing each data bit of the first sub-word immediately adjacent a corresponding data bit of the second sub-word such that immediately adjacent data bits of the data word can be corrected using separate error correction codes.

3. The method of claim 1 wherein the memory includes a plurality of memory chips and the entering step includes entering a data bit from each of the sub-words into each of the plurality of memory chips.

4. The method of claim 1, further including:

determining a third error correction code for a third sub-word of the data word, the third sub-word including a third subset of the data bits of the data word, the third subset comprising non-consecutive data bits of the data word, the third error correction code including a plurality of check bits and being determined based on all of the data bits of the third sub-word; and determining a fourth error correction code for a fourth sub-word of the data word, the fourth sub-word including a fourth subset of the data bits of the data word, the fourth subset comprising non-consecutive data bits of the data word that are intermediate data bits included in the third subset, the fourth error correction code including a plurality of check bits and being determined based on all of the data bits of the fourth sub-word, wherein each data bit of the first sub-word is immediately followed by a data bit of the second sub-word, each data bit of the second sub-word is immediately followed by a data bit of the third sub-word, each data bit of the third sub-word is immediately followed by a data bit of the fourth sub-word, and at least one of the data bits of the fourth sub-word is immediately followed by a data bit of the first sub-word when the data word is received.

5. The method of claim 4 wherein the first sub-word includes every fourth data bit of the data word beginning with a first data bit of the data word, the second sub-word includes every fourth data bit of the data word beginning with a second data bit of the data word, the third sub-word includes every fourth data bit of the data word beginning with a third data bit of the data word, and the fourth sub-word includes every fourth data bit of the data word beginning with a fourth data bit of the data word.

6. A computer-implemented method of performing data correction on a data word having a plurality of consecutive data bits, the method comprising:

dividing the data word into N sub-words, where N is an integer greater than 1, the data bits in each sub-word comprising every $N^{th}$ data bit in the data word;

determining a separate error correction code for each of the N sub-words, each error correction code including a plurality of check bits and being determined based on all of the data bits of the sub-word for which the error correction code is determined;

transmitting the sub-words and the error correction codes on a data bus;

receiving the sub-words and the error correction codes;

re-determining a separate new error correction code for each of the sub-words received based on all of the data bits of the sub-word for which the new error correction code is determined;

for each of the sub-words received, comparing the new error correction code re-determined for the sub-word with an appropriate one of the error correction codes received;

for each of the sub-words received, determining from the comparing step, which, if any, of the data bits of the sub-word is erroneous; and for each of the sub-words received, correcting the data bit, if any, determined to be erroneous.

7. The method of claim 6 wherein the transmitting step includes transmitting the sub-words and the error correction codes to a computer system memory and the receiving step includes receiving the sub-words and the error correction codes from the computer system memory.

8. The method of claim 6 wherein the integer N is equal to four, and wherein a first one of the sub-words includes every fourth data bit of the data word beginning with a first data bit of the data word, a second one of the sub-words includes every fourth data bit of the data word beginning with a second data bit of the data word, a third one of the sub-words includes every fourth data bit of the data word beginning with a third data bit of the data word, and a fourth one of the sub-words includes every fourth data bit of the data word beginning with a fourth data bit of the data word.

9. A computer storage medium encoded with a data structure for use by a computer, the data structure comprising:

a plurality of data words that provide the computer with computer instructions and data to be acted on by the computer, each data word including a plurality of consecutive data bits with data bit values; and N sub-words included in each of the data words, where N is an integer greater than 1, the data bits in each sub-word comprising every $N^{th}$ data bit in the data word;

for each of the data words, a plurality of error correction codes each associated with a corresponding one of the sub-words of the data word, each error correction code having a plurality of check bits with check bit values based on the data bit values of the corresponding subset of the data word, the check bit values of each error correction code being such that when the computer reads the data word from the computer storage medium the error correction code enables the computer to correct one of the data bit values of the sub-word corresponding to the error correction code if the data bit value of the sub-word is in error.

10. The computer storage medium of claim 9 wherein the integer N is equal to 4, and wherein each data word includes 64 bits with four sub-words of 16 bits and each error correction code includes 5 check bits that enable the computer to correct any one of the data bit values of the sub-word corresponding to the error correction code.

11. The computer storage medium of claim 9, further comprising:

a plurality of memory chips each having a plurality of data output pins structured to enable plural data bits to be output simultaneously from the memory chip, each of the plural data bits being from a different sub-word of a requested one of the data words.

12. A computer system for storing data, comprising:

an input device that receives data from a user;

a processor coupled to the input device, the processor being structured to process data according to programmed instructions;

a memory module that stores a plurality of data words for use by the processor, each data word including a plurality of consecutive data bits divided into N subsets of data bits having data values, where N is an integer greater than 1, the data bits in each subset comprising every $N^{th}$ data bit in the data word; and a memory controller coupling the memory module to the processor, the memory controller being structured to create a separate error correction code for each of the subsets of each of the plurality of data words stored in the memory module, each error correction code including a plurality of check bits computed based on the data bits of the subset corresponding to the error correction code.

13. The computer system of claim 12 wherein the memory controller includes N error correction modules each structured to create the error correction code for a corresponding one of the subsets of each data word.

14. The computer system of claim 12 wherein the memory controller is coupled to the processor by a plurality of data lines equal in number to the number of data bits in each data word and the memory controller includes N error correction modules each structured to create the error correction code for a corresponding one of the subsets of each data word, each error correction module being coupled to a subset of the data lines to receive the corresponding subset of each data word.

15. The computer system of claim 12 wherein the memory module includes a plurality of memory chips each having a plurality of data output pins structured to enable plural data bits to be output simultaneously from the memory chip, each of the plural data bits being from a different subset of a requested one of the data words.

16. The computer system of claim 12 wherein the integer N is equal to four, and wherein each data word includes 64 bits with four subsets of 16 bits and each error correction code includes 5 check bits that enable the memory controller to correct any one of the data bit values of the subset corresponding to the error correction code.

17. The computer system of claim 12, wherein the memory controller includes:
   a buffer that temporarily stores the data word, the buffer including a plurality of output ports for outputting groups of consecutive data bits of the data word;
   a first error correction module coupled to the buffer to receive a first data bit of each group of consecutive data bits of the data word; and
   a second error correction module coupled to the buffer to receive a second data bit of each group of consecutive data bits of the data word, each second data bit being immediately adjacent each first data bit in the data word.

18. A computer system for storing data, comprising:
   an input device that receives data from a user;
   a processor coupled to the input device, the processor being structured to process data according to programmed instructions;
   a memory module that stores a data word for use by the processor, the data word including a plurality of consecutive data bits divided into N sub-words of data bits having data values, where N is an integer greater than 1, the data bits in each sub-word comprising every $N^{th}$ data bit in the data word, the memory module also storing a separate original error correction code for each of the sub-words of the of data word stored in the memory module, each original error correction code including a plurality of check bits computed based on the data bits of the sub-word corresponding to the original error correction code; and
   a memory controller coupling the memory module to the processor, the memory controller being structured to receive the data word and the original error correction codes corresponding to the sub-words of the data word, create a separate new error correction code for each of the sub-words of the data word received from the memory module, compare each new error correction code with a corresponding one of the original error correction codes to determine whether the data word was altered in error, and correct a data bit in each sub-word altered in error.

19. The computer system of claim 18 wherein the memory controller includes N error correction modules each structured to create the original and new error correction codes for a corresponding one of the sub-words of the data word.

20. The computer system of claim 18 wherein the memory controller is coupled to the processor by a plurality of data lines equal in number to the number of data bits in the data word and the memory controller includes N error correction modules each structured to create the new error correction code for a corresponding one of the sub-words of the data word, each error correction module being coupled to a separate subset of the data lines to receive the corresponding sub-word of each data word and the error correction code corresponding to the corresponding sub-word.

21. The computer system of claim 18 wherein the memory module includes a plurality of memory chips each having a plurality of data output pins structured to enable plural data bits to be output simultaneously from the memory chip, each of the plural data bits being from a different sub-word of the data word.

22. The computer system of claim 18 wherein the integer N is equal to four, and wherein the data word includes 64 bits with four sub-words of 16 bits and each original error correction code includes 5 check bits that enable the memory controller to correct any one of the data bit values of the sub-word corresponding to the error correction code.

23. A memory controller for storing a data word in a computer memory, the data word including a plurality of consecutive data bits, the memory controller comprising:
   N error correction modules each coupled to receive a corresponding one of N multi-bit sub-words of the data word, where N is an integer greater than 1, the data bits in each sub-word comprising every $N^{th}$ data bit in the data word, each error correction module being structured to create a separate error correction code for the sub-word received by the error correction module, each error correction code including a plurality of check bits based on all of the data bits of the sub-word corresponding to the error correction code; and
   a processor coupled to the plurality of error correction modules, the processor causing each of the error correction modules to transmit to the computer memory the sub-word received by the error correction module and the error correction code created for that sub-word.

24. The memory controller of claim 23, further comprising:
   a data buffer having a plurality of output ports equal in number to the plurality of data bits of the data word, each error correction module being coupled to a separate subset of the output ports to receive the sub-word corresponding to the error correction module.

25. The memory controller of claim 23 wherein the integer N is equal to four, and wherein the data word includes 64 bits with four sub-words of 16 bits and each error correction code includes 5 check bits that enable the memory controller to correct any one of the data bit values of the sub-word corresponding to the error correction code.

26. The memory controller of claim 23, further comprising:
   a buffer that temporarily stores the data word, the buffer including a plurality of output ports for outputting groups of consecutive data bits of the data word, wherein a first one of the error correction modules is coupled to the buffer to receive a first data bit of each group of consecutive data bits of the data word and a second one of the error correction modules is coupled to the buffer to receive a second data bit of each group of consecutive data bits of the data word.

* * * * *